(12) United States Patent
Hood

(10) Patent No.: US 10,933,826 B1
(45) Date of Patent: Mar. 2, 2021

(54) AUTOMOTIVE BUMPER WITH STORAGE AND METHOD OF USE

(71) Applicant: Darrel Hood, Fort Worth, TX (US)

(72) Inventor: Darrel Hood, Fort Worth, TX (US)

( * ) Notice: Subject to any disclaimer, the term of this patent is extended or adjusted under 35 U.S.C. 154(b) by 0 days.

(21) Appl. No.: 15/898,452

(22) Filed: Feb. 17, 2018

Related U.S. Application Data

(60) Provisional application No. 62/460,357, filed on Feb. 17, 2017.

(51) Int. Cl.
| | | |
|---|---|---|
| *B60R 19/02* | (2006.01) | |
| *B60R 19/48* | (2006.01) | |
| *E05B 47/00* | (2006.01) | |
| *B60R 7/00* | (2006.01) | |

(52) U.S. Cl.
CPC ............... *B60R 19/48* (2013.01); *B60R 7/00* (2013.01); *B60R 19/023* (2013.01); *E05B 47/0001* (2013.01)

(58) Field of Classification Search
CPC ...... C08L 23/10; C08L 2666/04; B60R 19/18; B60R 9/06; B60R 9/10; B62D 25/084; B62D 21/152; Y10S 224/924; B60D 1/60
See application file for complete search history.

(56) References Cited

U.S. PATENT DOCUMENTS

| | | | | |
|---|---|---|---|---|
| 3,614,136 A | * | 10/1971 | Dent ....................... | B60R 19/48 220/255 |
| D278,894 S | * | 5/1985 | James ......................... | D12/169 |
| 4,570,986 A | * | 2/1986 | Sams ....................... | B60R 19/48 224/402 |
| 4,674,782 A | * | 6/1987 | Helber .................... | B60R 19/48 224/401 |
| 4,746,263 A | * | 5/1988 | Cook ....................... | B60P 1/549 212/303 |
| 4,893,856 A | * | 1/1990 | Council ................... | B60D 1/06 293/106 |
| 4,896,910 A | * | 1/1990 | Carter ..................... | B60D 1/56 224/402 |
| 4,901,895 A | * | 2/1990 | Gancarz ................... | B60P 7/04 224/402 |
| 4,958,870 A | * | 9/1990 | Carter ..................... | B60D 1/56 224/402 |
| D316,070 S | * | 4/1991 | Riss ........................... | D12/169 |
| 5,016,932 A | * | 5/1991 | Carter .................... | B60R 19/48 224/489 |
| 5,135,274 A | * | 8/1992 | Dodd ...................... | B60R 11/06 224/491 |
| 5,364,142 A | * | 11/1994 | Coiner .................... | B60R 19/48 293/106 |
| 5,664,811 A | * | 9/1997 | Martus ................... | B60K 15/05 292/144 |

(Continued)

*Primary Examiner* — Kiran B Patel

(74) *Attorney, Agent, or Firm* — Richard Eldredge; Eldredge Law Firm

(57) ABSTRACT

An automotive bumper includes an elongated body to extend across an end of a vehicle, the elongated body has walls forming a first compartment; a lid attached to the elongated body to enclose the first compartment; an attachment device secured to one of the walls to attach the elongated body to a vehicle; a lock to secure the lid in a closed position against the elongated body; and an actuator connected to the lock and electrically coupled to an electronic device; the electronic device unlocks the lock.

10 Claims, 5 Drawing Sheets

(56) References Cited

U.S. PATENT DOCUMENTS

| | | | | |
|---|---|---|---|---|
| 5,823,585 A * | 10/1998 | Tanguay | B60R 19/48 | 293/106 |
| 5,979,953 A * | 11/1999 | Rinehart | B60R 19/48 | 293/106 |
| 6,151,933 A * | 11/2000 | Lentini | B60R 9/00 | 70/159 |
| 6,516,983 B2 * | 2/2003 | Sotiroff | B60J 5/047 | 224/281 |
| 6,575,509 B1 * | 6/2003 | Golden | B60R 9/06 | 293/106 |
| 6,598,914 B1 * | 7/2003 | Dixon | B60K 11/04 | 293/106 |
| 6,659,525 B2 * | 12/2003 | Delavalle | B60R 5/041 | 296/26.08 |
| 6,945,576 B1 * | 9/2005 | Arentzen | B60K 13/02 | 180/68.3 |
| 6,969,084 B2 * | 11/2005 | Kaepp | B60D 1/485 | 280/500 |
| 8,011,704 B2 * | 9/2011 | Nees | B60R 19/48 | 293/106 |
| 8,109,400 B2 * | 2/2012 | Langston | G21F 5/015 | 220/1.5 |
| 8,109,560 B2 * | 2/2012 | Joly-Pottuz | B60R 19/48 | 293/107 |
| 8,196,988 B1 * | 6/2012 | Malleck | B60R 15/02 | 224/400 |
| 8,256,807 B2 * | 9/2012 | Lucas | B60R 7/02 | 293/106 |
| 8,573,660 B2 * | 11/2013 | Cha | B60R 19/48 | 224/489 |
| 8,596,507 B2 * | 12/2013 | Lee | B60R 5/04 | 224/488 |
| 8,602,439 B2 * | 12/2013 | Lee | B60D 1/54 | 280/491.1 |
| 8,602,467 B2 * | 12/2013 | Lee | B60R 19/48 | 293/106 |
| 8,789,865 B2 * | 7/2014 | Cha | B60R 19/48 | 293/106 |
| 9,310,118 B2 * | 4/2016 | Zavitsanos | A45C 11/20 | |
| 9,616,820 B2 * | 4/2017 | Raley | B60R 3/00 | |
| 9,701,266 B2 * | 7/2017 | Pena Casimiro | B60R 19/20 | |
| 10,195,999 B1 * | 2/2019 | Glickman | B62D 25/10 | |
| 2003/0127874 A1 * | 7/2003 | McLaughlin | B60R 5/041 | 296/26.09 |
| 2014/0267740 A1 * | 9/2014 | Almomani | G07C 9/00182 | 348/156 |

* cited by examiner

AUTOMOTIVE BUMPER WITH STORAGE AND METHOD OF USE

BACKGROUND

1. Field of the Invention

The present invention relates generally to vehicle systems, and more specifically, to a vehicle bumper for securely storing and transporting items.

2. Description of Related Art

Vehicle systems are well known in the art and are effective means to transport cargo from one location to another. For example, FIG. 1 depicts a conventional truck 101 having a bed 103 and a bumper 105. During use, cargo is generally placed inside bed 103 for transportation, while bumper 105 is design to protect truck 101 in the event of an impact.

One of the problems commonly associated with system 101 is insecurity. For example, a common practice involves placing items such as boots, tools, and valuables in bed 103 due to limited space in cab 107 or to protect the interior of cab 107 from dirt. Placing items in bed 103 has the potential for items to become lost or stolen as they are in plain view.

Accordingly, although great strides have been made in the area of vehicle systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
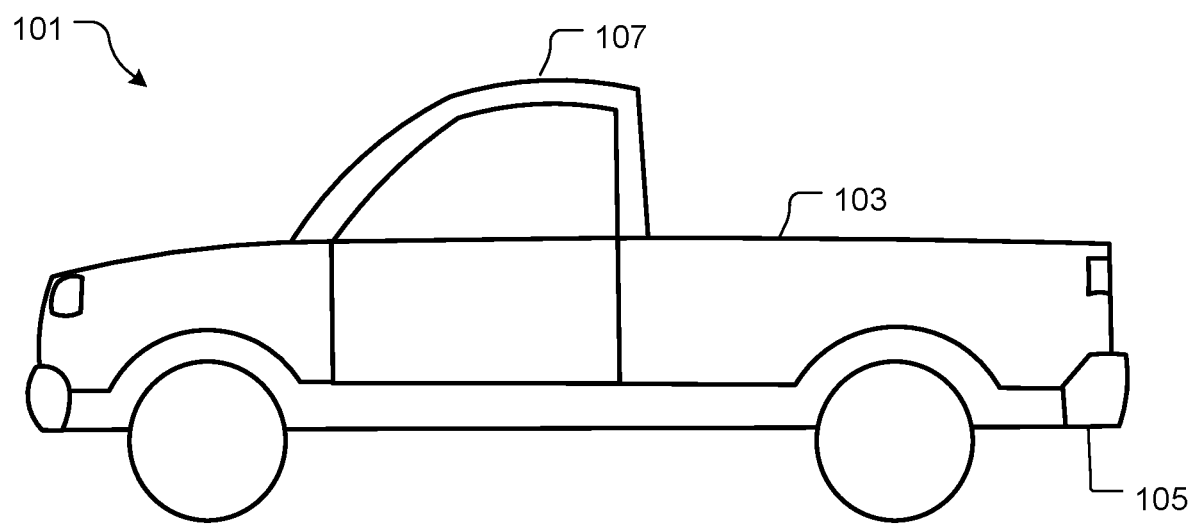
FIG. 1 is a side view of a common vehicle system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicle systems. Specifically, the present invention provides a means to conceal and securely transport items with a vehicle. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
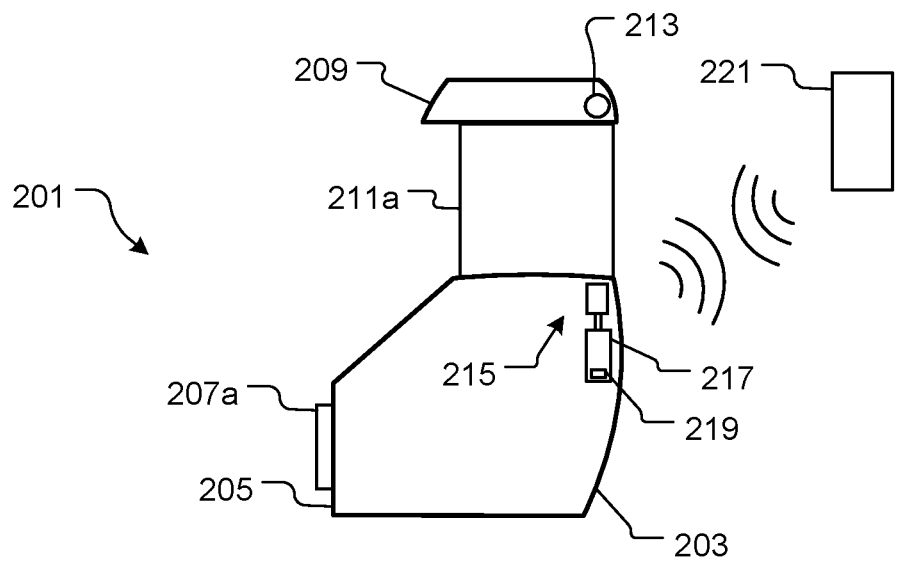
FIGS. 2A and 2B are side views of a vehicle bumper in accordance with a preferred embodiment of the present application.
Figure 2B:
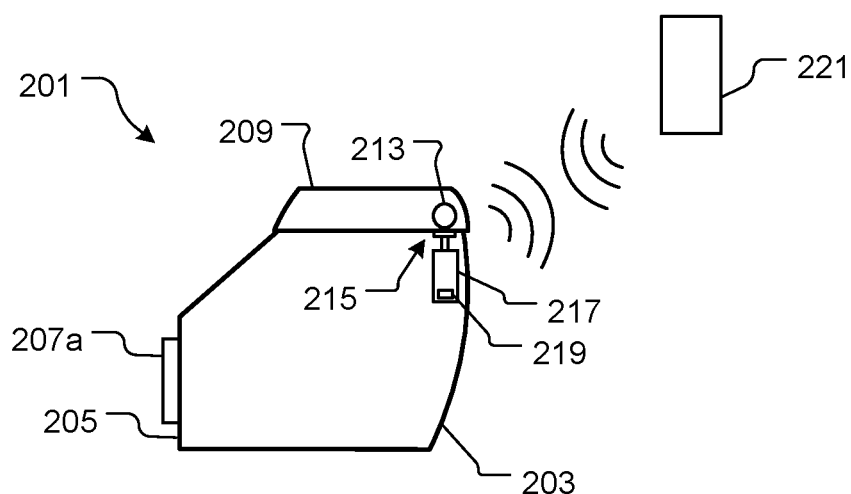

Referring now to the drawings wherein like reference characters identify corresponding or similar elements throughout the several views, FIGS. 2A and 2B depict side views of a bumper 201 in accordance with a preferred embodiment of the present application. It will be appreciated that bumper 201 overcomes one or more of the above-listed problems commonly associated with conventional vehicle systems.

In the contemplated embodiment, bumper 201 includes an elongated body 203 with at least one side 205 having at least one attachment device 207a, 207b configured to attach to a vehicle (not shown). It should be understood that attachment device 207a can vary as necessary to allow bumper 201 to attach to a variety of vehicles.

In the preferred embodiment, bumper 201 includes a lid 209 connected to body 203 by one or more arms 211a, 211b. Lid 209 is adapted with a locking means 213 configured to engage with a lock 215 on body 203. Lock 215 is electrically coupled to an actuator 217 having a transmitter 219 in wireless communication with an electronic device 221, such as a remote or a smartphone.

It should be appreciated that one of the unique features believed characteristic of the present application is the means of locking lid 209 to body 203. It should be understood that the locking configuration allows for a user to unlock bumper 201 from a distance. In addition, it should be appreciated that the locking mechanism is concealed within the walls of body 203 and the lid 209, thereby increasing security as a third party would likely not recognize the ability of bumper 201 to open.

Figure 3A:
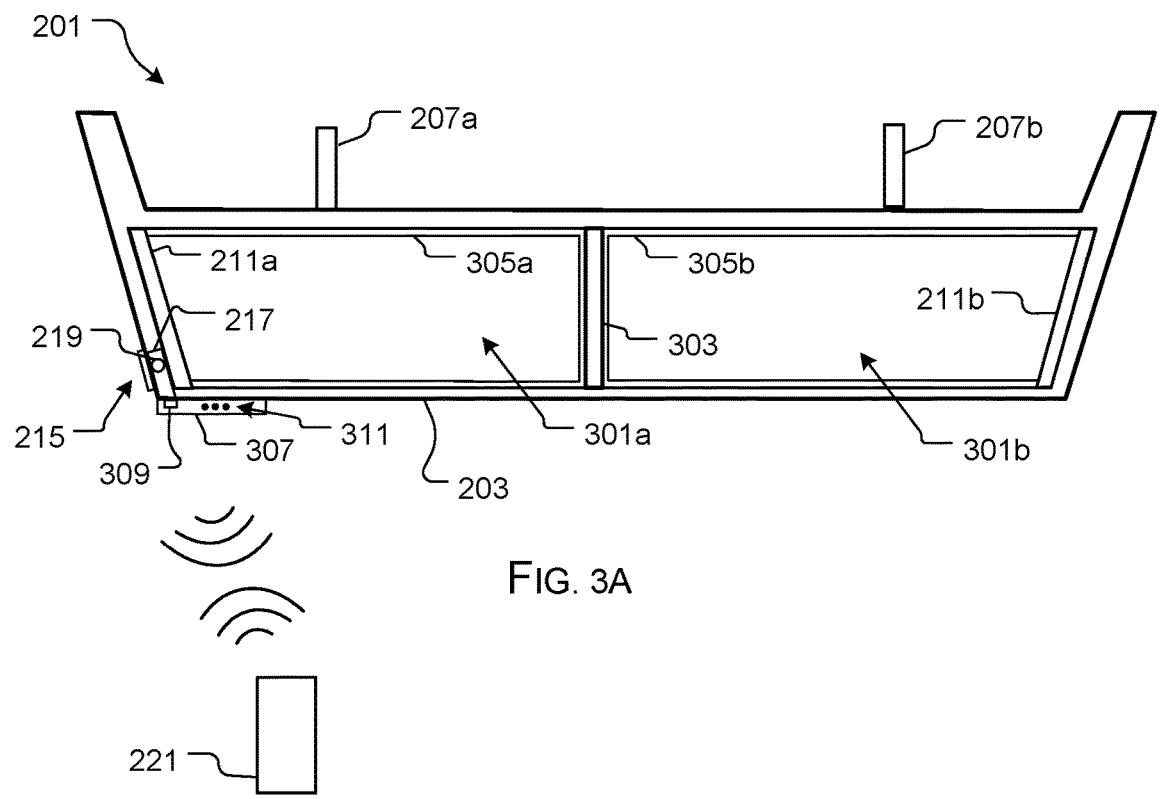
FIGS. 3A and 3B are top views of the vehicle bumper of FIGS. 2A and 2B.
Figure 3B:
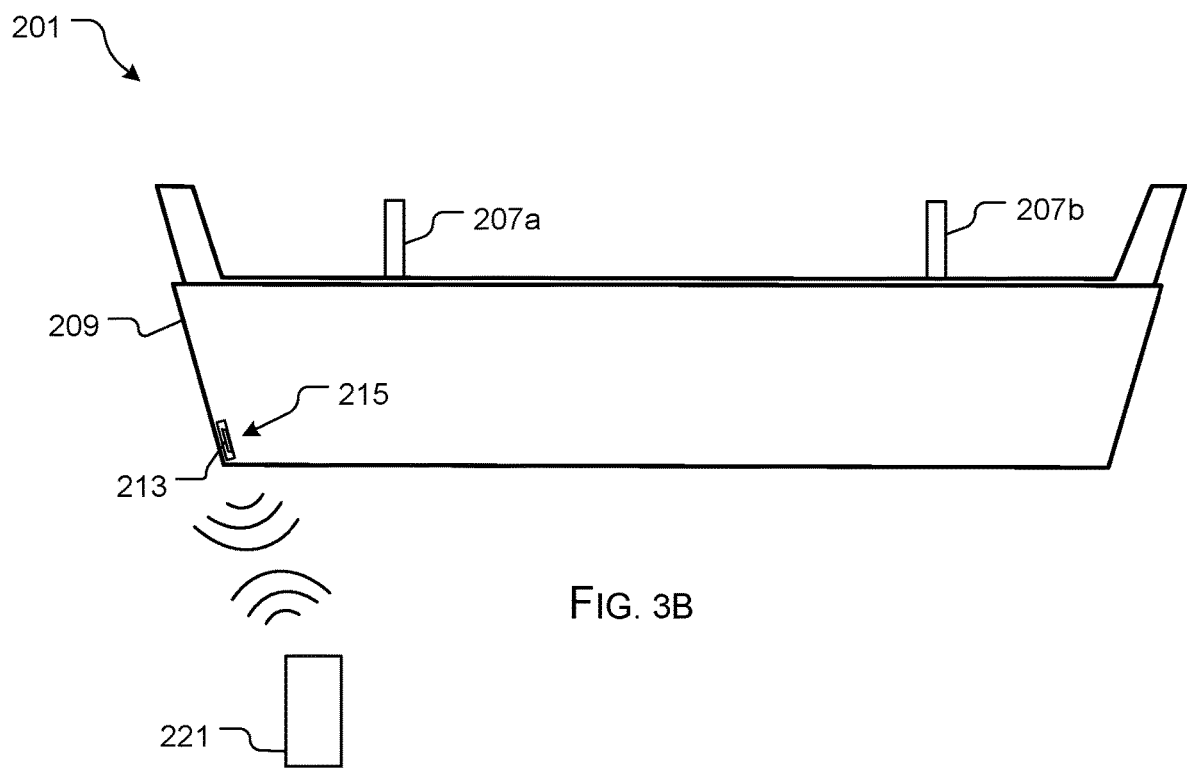
Figure 5:
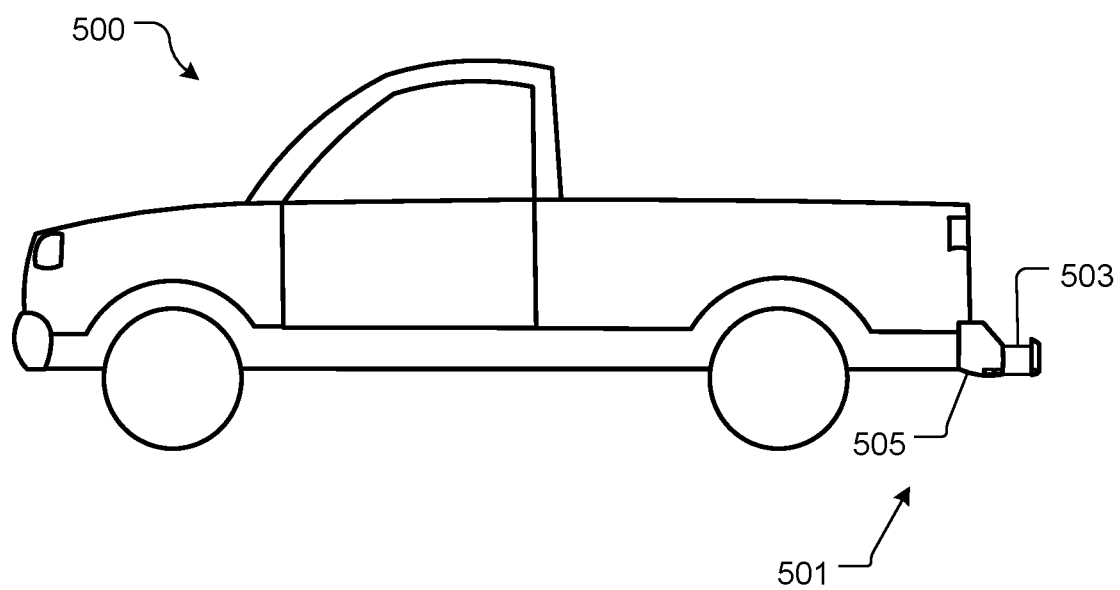
FIG. 5 is a side view of a truck with an alternative embodiment of a vehicle bumper in accordance with the present invention.

In FIG. 3A a top view of the body 203 of bumper 201, with the lid removed entirely for clarity, is shown, and in FIG. 2B a top view of the body 203 with the lid 209 is shown. In the preferred embodiment, body 203 is configured to enclose one or more compartments 301a, 301b being separated by a divider 303 and being concealed by lid 209 when in a closed position, as shown in FIG. 3B. It should be appreciated, that lid 209 can be pivotally connected to body 203 by arms 211a, 211b, or alternatively, can be slidingly connected to body 203 by arms 211a, 211b, wherein the lid is configured to slide away from body 203 like a drawer, as shown in FIG. 5. It is contemplated that compartments 301a, 301b can include protective liners 305a, 305b composed of a material such as weatherproof rubber.

It is further contemplated that bumper 201 can include a touchpad 307 electrically coupled to actuator 217, wherein touchpad 307 is configured to provide additional means of unlocking lid 209. Touchpad 307 can include a fingerprint scanner 309 for reading a user's fingerprint and thereby unlocking lid 209 based on fingerprint. In addition, touchpad 307 can include a key pad 311 configured to unlock lid 209 based on a numerical entry by the user. It is contemplated that touchpad 307 can be positioned on body 203 below lid 209, thereby further concealing the locking mechanism.

Figure 4:
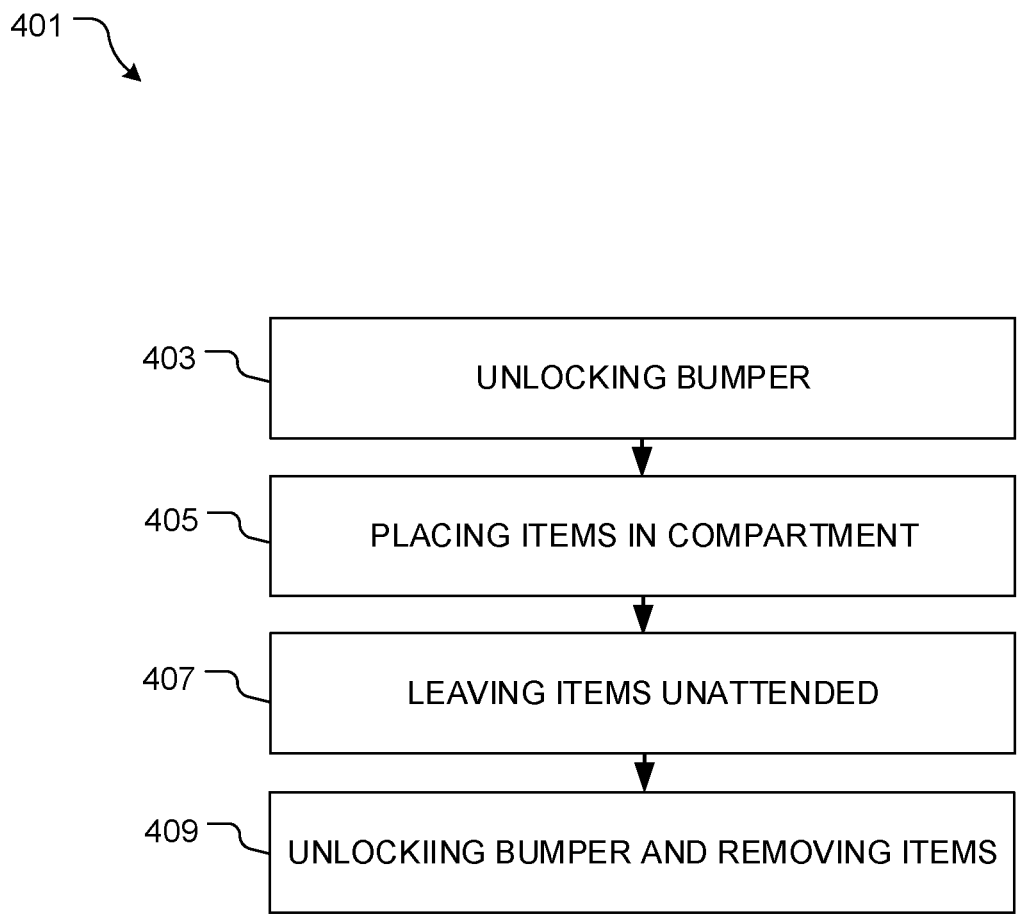
FIG. 4 is a flowchart of the method of use of the bumper of FIGS. 2A and 2B.

As shown in FIG. 4, a flowchart 401 depicts the method of use associated with bumper 201. During use, the user unlocks bumper 201 via one of the means described above and inserts items such as boots, tools, firearms, etc., into one of the compartments 301a, 301b, as shown with boxes 403, 405. The items are securely stored within bumper 201 until needed, at which point bumper 201 is unlocked and the items are removed, as shown with boxes 407, 409.

In FIG. 5, a vehicle 500 is shown with a bumper 501 in accordance with an alternative embodiment of the present application. Bumper 501 includes all of the features discussed herein, but is configured to attach to vehicle 500 in a configuration, wherein the door 503 slides away from the body 505 like a drawer.

It is further contemplated that bumpers 201 and 501 can be manufactured into a number of vehicles, thereby decreasing the work and expense associated with replacing a factory bumper with bumper 201 and/or 501.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An automotive bumper, comprising:
   an elongated body configured to extend at least partially across an end of a vehicle, the elongated body having:
      a plurality of walls forming a first compartment;
      a lid attached to the elongated body and configured to enclose the first compartment, the lid is configured to engage with the elongated body with a plurality of arms and configured to slidingly engage with the elongated body via the plurality of arms;
      an attachment device secured to one of the plurality of walls and configured to attach the elongated body to a vehicle;
      a lock configured to secure the lid in a closed position against the elongated body; and
   an actuator secured to the elongated body and connected to the lock and electrically coupled to an electronic device, the actuator is configured to move the lid relative to the elongated body;
   wherein the electronic device is configured to unlock the lock and open the lid via the actuator.

2. The automotive bumper of claim 1, further comprising:
   a second compartment disposed within the plurality of walls and separated from the first compartment by a divider.

3. The automotive bumper of claim 1, wherein the first compartment further comprises:
   a protective layer attached to an interior surface of each of the plurality of walls.

4. The automotive bumper of claim 3, wherein the protective layer is a weatherproof rubber.

5. The automotive bumper of claim 1, further comprising:
   a touchpad electrically connected to the actuator;
   wherein the touchpad is configured to unlock the lock via the actuator.

6. The automotive bumper of claim 5, wherein the touchpad further comprises:
   a fingerprint recognition module configured to read a user's fingerprint.

7. The automotive bumper of claim 5, wherein the touchpad further comprises a key pad configured to receive a number code from a user.

8. The automotive bumper of claim 1, wherein the electronic device is a smartphone.

9. The automotive bumper of claim 1, wherein the electronic device is a remote.

10. A method of securing items associated with a vehicle, the method comprising: providing the automotive bumper of claim 1;
   securing the automotive bumper to the end of the vehicle via the attachment device;
   unlocking the lock via the electronic device communicating with the actuator; opening the lid;
   placing the items within the first compartment for storage and transportation; and
   closing the lid to lock the items within the first compartment.

* * * * *